H. VAN V. DEMING.
SHOCK ABSORBER.
APPLICATION FILED MAY 31, 1916.
1,212,133.
Patented Jan. 9, 1917.
2 SHEETS—SHEET 2.
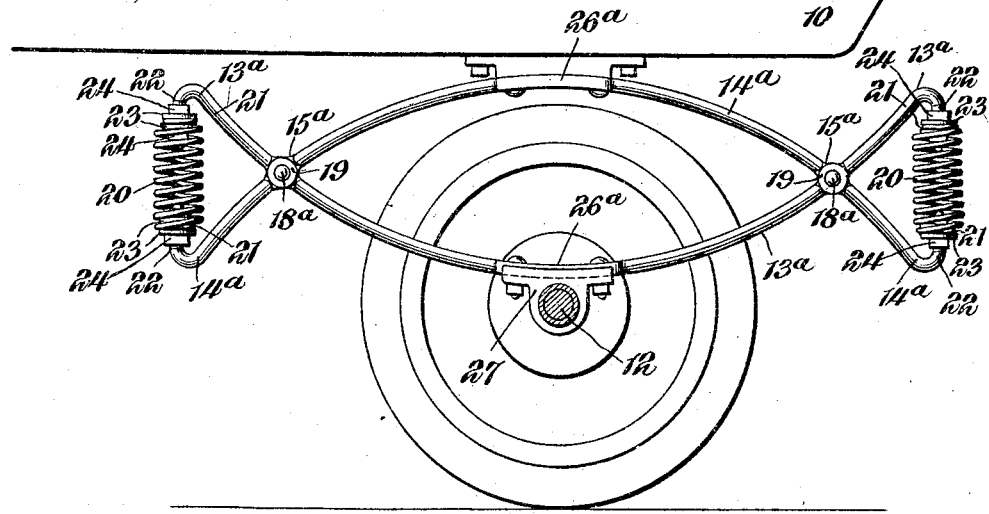
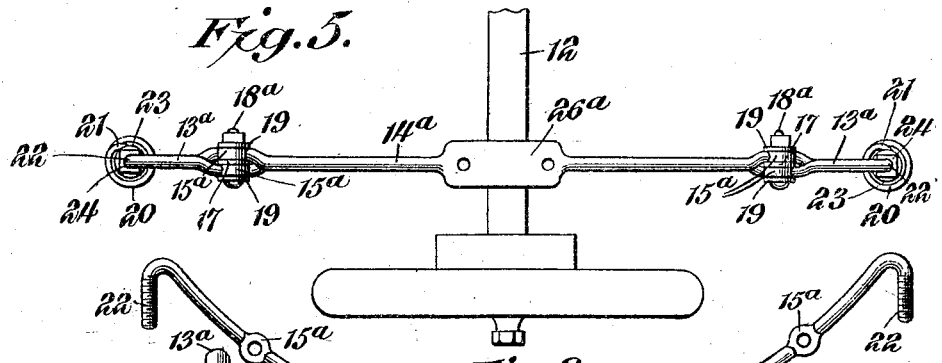
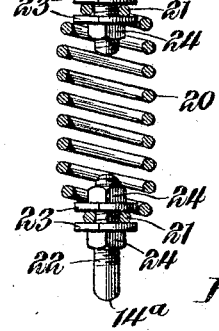
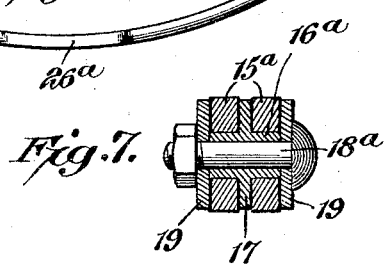
Herbert Van Vechten Deming, INVENTOR,

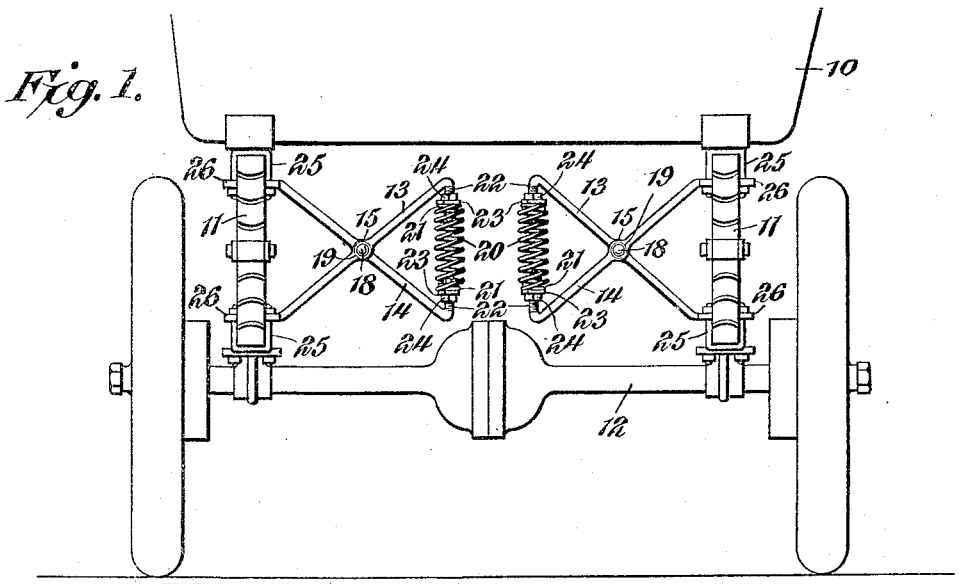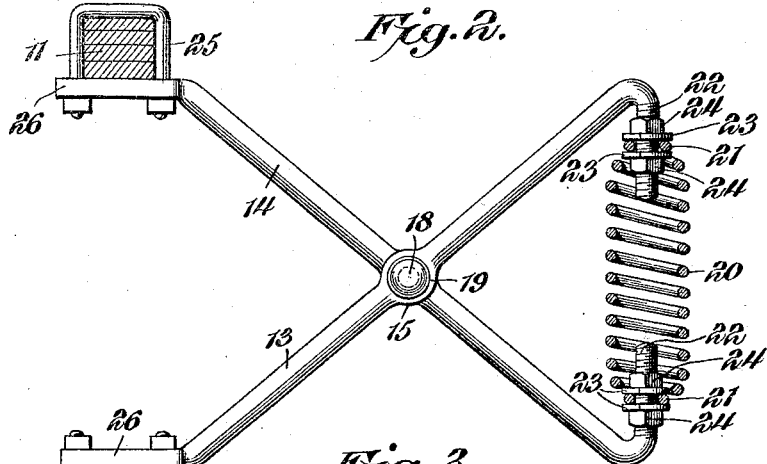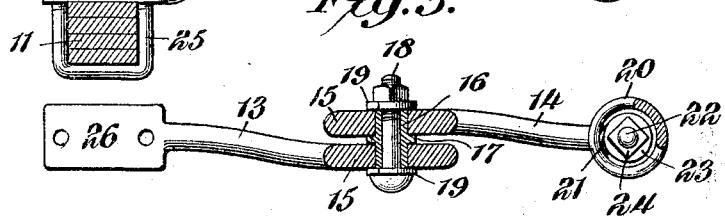

UNITED STATES PATENT OFFICE.

HERBERT VAN VECHTEN DEMING, OF CUMBERLAND, MARYLAND.

SHOCK-ABSORBER.

1,212,133.

Specification of Letters Patent.

Patented Jan. 9, 1917.

Application filed May 31, 1916. Serial No. 100,964.

*To all whom it may concern:*

Be it known that I, HERBERT VAN VECHTEN DEMING, a citizen of the United States, residing at Cumberland, in the county of Allegany and State of Maryland, have invented a new and useful Shock-Absorber, of which the following is a specification.

The present invention relates to an improvement in shock absorbers adapted for use on vehicles or in any place where a spring structure may be employed.

It is an object of this invention to provide a device which is auxiliary or adjunct to the ordinary spring construction of vehicles, or the like; which strengthens and reinforces the ordinary spring construction against abnormal shock or strain; which urges the ordinary spring construction toward normal position; and which, to a large extent, checks the rebound of the ordinary spring construction, and thus absorbs shock to which the vehicle would otherwise be subjected.

Other objects and advantages of the invention will be brought out in the following specific disclosure of the present preferred embodiments of the invention, the same being illustrated in the accompanying drawings, wherein—

Figure 1 is a rear elevation of a vehicle, showing one form of shock absorber, constructed according to the present invention, as applied to the springs of the vehicle. Fig. 2 is a detail enlarged side elevation of the shock absorber, showing the spring thereof in section, and also showing the upper and lower portions of the vehicle spring in section. Fig. 3 is a horizontal section, taken centrally through the shock absorber, showing the pivotal connection of the same in section. Fig. 4 is a side elevation of a portion of a vehicle, showing a slightly modified construction of the shock absorber, wherein the same comprises an integral portion of the spring construction of the vehicle. Fig. 5 is a top plan view of the same, the body of the vehicle being removed. Fig. 6 is an end elevation of the modified construction of Fig. 4, enlarged, and showing the spring in section. Fig. 7 is a detail enlarged sectional view, taken transversely through the pivotal connection between the crossed arms of the device. Fig. 8 is a detail side elevation of one of the two members which constitute the combined main and auxiliary spring structure of the modified form shown in Fig. 4.

Referring to these drawings, wherein like parts are designated by similar numerals of reference throughout the several views, and referring first to Figs. 1, 2 and 3, which show one form of the invention, 10 designates the body of the vehicle provided with the usual leaf springs 11 of the elliptic or semi-elliptic type, such as are now commonly employed, and which connect the axle 12 to the body. In this form of the invention, the latter is embodied in a pair of crossed arms 13 and 14, which are preferably made from bar steel, although any other suitable material and formation may be given these arms. The intermediate portions of the arms are flattened as at 15, and are suitably apertured to receive therethrough the opposite ends of a bushing or sleeve 16 upon which the arms 13 and 14 are pivotally mounted. The bushing 16 preferably has, intermediate its ends, an annular flange 17 adapted to lie between the flattened portions 15 and hold the same apart to an extent sufficient to prevent undue friction between the relatively movable arms 13 and 14. The arms are held on the bushing 16 by a bolt or pivot pin 18, which is headed at one end and receives the usual nut at its opposite end to bind washers 19 against the opposite ends of the bushing 16 and against the opposite outer faces of the flattened portions 15, as shown to advantage in Fig. 3. The outer or free ends of the arms 13 and 14 are connected together by a coiled spring 20. The coiled spring 20 has its extreme upper and lower helices reduced in diameter to provide attaching rings 21, through which slidably engage the inturned threaded outer extremities 22 of the arms 13 and 14. These threaded ends 22 of the arms provide stems, which extend inwardly toward each other and which are spaced sufficiently apart to admit of the free pivoting of the arms 13 and 14 to the desired extent. Split or lock washers 23 are arranged upon the stems 22, one against each side of each of the attaching rings 21. Retaining nuts 24 are threaded on the stems 22 and bind the washers against the opposite sides of the rings 21, to hold the ends of the spring 20 to the outer ends of the arms 13 and 14. It is apparent that by manipulating the nuts 24, the washers and the attaching rings 21 may be moved longitudinally on the stems to shorten or lengthen the distance between the outer ends of the arms 13 and 14. The arms 13 and 14 are secured to the upper and lower portions of the spring 11 by means of clips 25, which encircle the springs, and which engage the inner flattened or web portions 26 to secure the same to the spring. As shown in Fig. 3, the inner end of each arm is flattened and broadened to provide the web portion 26, the same being apertured to receive the ends of the clip 25 therethrough. It is, of course, understood that any other means may be employed for securing the inner ends of the arms 13 and 14 to the upper and lower portions of the spring 11. From Fig. 1, it will be noted that the clips 25 are preferably independent of the usual spring attaching clips employed on the vehicle, and that the clips 25 are secured to the spring 11 at one side of the central vertical axis of the spring. When the spring is compressed, by rise of the axle 12, the inner ends of the arms 13 and 14 approach one another, and the outer ends of the arms also approach one another and compress the spring 20, which latter assists the main spring 11 in supporting the load, and in taking up the shock. The inherent resiliency of the ordinary spring 11 is supplemented by the tension of the spring 20 to return the parts to normal position. The rebound or expansion of the spring 11 is checked by the expansion of the spring 20 beyond normal position, as the inner and outer ends of the arms 13 and 14 are spread apart. The provision of the bushing 16 with its flange 17 affords not only a substantial pivotal bearing and support for the arms 13 and 14, but it also provides for the spacing apart of the webs, or flattened portions 15 of the arms to prevent any undue friction or binding of the parts, and holds the washers 19 from binding too tightly against the webs 15. The arms 13 and 14 are preferably made of spring steel and have a certain resiliency in action as the upper and lower sections of the elliptic spring 11 are moved toward and from each other.

In Figs. 4 to 8 inclusive, there is shown another form of the present invention, wherein the shock absorber of the invention is slightly changed in construction to provide not only the auxiliary spring, but also the main supporting spring for the vehicle. In this instance, the ordinary spring supporting structure is modified in form, although remaining of elliptical or semi-elliptical construction, as is usual.

From Figs. 4 and 8, it will be noted that the combined spring structure comprises a pair of arms $13^a$ and $14^a$, which, as in the preferred form, have webs $15^a$, which are crossed and pivotally connected together by a bolt $18^a$, as shown to advantage in Fig. 7. In Fig. 7, the bolt $18^a$ is relatively large, as it is depended upon to a large extent to support the weight of the body 10. The bushing $16^a$ is also relatively large and the web portions $15^a$ are made relatively thick and are rotatably mounted on the bushing $16^a$. As shown in Fig. 6 of the drawings, the outer ends of the arms $13^a$ and $14^a$ are of the same construction as shown in the form disclosed in Fig. 2, the spring 20 being attached in a similar manner and being adjustable between the stems 22. The arms $13^a$ and $14^a$ are extended inwardly to attaching webs $26^a$, which are secured, one to the body 10, as shown in Fig. 4, and the other to a clip 27, which is carried by the axle 12 beneath the vehicle. The inner ends of the arms are preferably elongated, so as to impart to the arms an inherent resiliency to take the place of the leaf springs, which are usually employed. The arms $13^a$ and $14^a$ are continued beyond the webs $26^a$, as shown in Fig. 4, and are again crossed near their opposite ends and flattened as at $15^a$ to provide crossed webs to receive a pivot bolt $18^a$, which connects the webs in the manner above described, and shown in Fig. 7. The opposite extremities of the arms $13^a$ and $14^a$ are provided with a second coiled spring 20, which yieldingly holds the extremities of the arms in spaced apart relation. The arms $13^a$ and $14^a$ project to a considerable extent beyond the opposite ends of the web portions $26^a$, and are arcuate throughout their lengths, so as to provide, when assembled, as shown in Fig. 4, a full elliptic spring. The arms are adapted to be made of steel and to have sufficient inherent flexibility to support the body 10 and admit of the usual vibration of the axle 12 therebeneath. When, however, the elliptic portion of the structure is compressed, the outer ends of the arms $13^a$ and $14^a$ are swung about their pivots $18^a$ to expand and contract the coiled springs 20, which assist the resilient arms $13^a$ and $14^a$ in supporting the body, or offer a resistance to the undue spreading of the arms at their intermediate portions. As shown in Fig. 8, this combined spring structure, shown in Fig. 4, is made of two arms which are arcuate in form, and which are each in one piece, having the intermediate webs $26^a$ and $15^a$.

In both forms of the invention, it will be noted that the device comprises a pair of crossed arms having one end of each secured to the relatively movable members of the spring construction, or the body and the axle. The opposite ends of the crossed and pivoted arms are connected together by a spring which offers resistance to either expansion or compression. Thus, the arms are urged into an intermediate normal position, and the tension of the spring is increased upon the expansion or compression thereof in the movement of the body and the axle toward each other, or in the undue spreading of the same.

The nuts 24 may be adjusted along the stems 22, so as to increase or decrease the tension of the springs 20 and thus change the normal inert position of the springs 20 to accommodate the loads which are placed upon the main elliptic spring.

The combined spring structure disclosed in the form shown in Figs. 4 to 8 inclusive, comprises substantially nothing more than a pair of the devices of the form shown in Figs. 1, 2 and 3, the pair having their inner ends merging into the webs 26ª, and the arms extending outwardly in opposite directions therefrom. It will be noted from Figs. 5 and 8 particularly, that the arms 13ª and 14ª are provided with substantially horizontal web portions 26ª and with substantially vertical web portions 15ª near the opposite ends of the arms. It will also be observed from Fig. 4 that the crossed arms at the opposite ends of the elliptic spring structure are connected to, or merge into, the upper and lower portions of the main spring structure.

What is claimed is:—

1. A shock absorber comprising a pair of arms crossed at intermediate points of their lengths and pivotally connected at the crossing points, said arms having at their outer ends stems which extend inwardly toward each other, a coiled spring lying between the outer ends of said arms and engaging at its ends over the stems, adjustable securing means between the coiled spring and said stems to connect the spring thereto, and attaching means for securing said arms beyond their pivotal connection to the relatively movable parts of a vehicle.

2. In a shock absorber, a pair of crossed arms having flattened webs at their crossed portions and an attaching web inwardly therefrom, and having at their outer ends stems which extend toward and are spaced apart from one another, a bolt pivotally connecting the crossed webs of the arms, a coiled spring engaging at its ends over the said stems, means adjustable on the stems for securing the ends of the spring thereto, and means engaging the attaching webs to secure the same to the relatively movable parts of a vehicle.

3. A shock absorber comprising two pairs of crossed arms, a bolt pivotally connecting the crossed portions of each pair of arms, a spring connecting the outer ends of each pair of arms, and vehicle attaching webs joining the inner portions of the respective arms of each pair.

4. A shock absorber comprising two pairs of crossed arms having intermediate attaching web portions, means for pivotally connecting each pair of arms together at the points of crossing, said arms having threaded outer ends turned inwardly toward each other, a coiled spring having its end coils engaging over said threaded ends, retaining nuts on said threaded ends to adjustably connect the ends of the spring thereto, and means connecting the attaching web portions to the relatively movable parts of a vehicle.

5. A shock absorber comprising two members of semi-elliptical form having midway of their length attaching means for securing said members to independent parts of a vehicle, said members crossing each other near their outer ends on each side of the respective points of attachment of said members, said members being pivoted together at the points of crossing, said members diverging outwardly from the crossing points and then bent inwardly at their terminals, and a coiled spring mounted between each pair of terminals.

In testimony, that I claim the foregoing as my own, I have hereto affixed my signature in the presence of two witnesses.

HERBERT VAN VECHTEN DEMING.

Witnesses:
FRANK G. LEEMAN,
E. R. JOHNSTON.

Copies of this patent may be obtained for five cents each, by addressing the "Commissioner of Patents, Washington, D. C."